(No Model.)

A. McDONALD.
STRAW DUMP ATTACHMENT FOR COMBINED HARVESTERS.

No. 443,648. Patented Dec. 30, 1890.

Witnesses,
Geo. H. Strong.
J. B. Nourse

Inventor,
Alexander McDonald
By Dewey & Co.
attys

UNITED STATES PATENT OFFICE.

ALEXANDER McDONALD, OF FRANKLIN, CALIFORNIA.

STRAW-DUMP ATTACHMENT FOR COMBINED HARVESTERS.

SPECIFICATION forming part of Letters Patent No. 443,648, dated December 30, 1890.

Application filed April 24, 1890. Serial No. 349,334. (No model.)

*To all whom it may concern:*

Be it known that I, ALEXANDER MCDONALD, a citizen of the United States, residing at Franklin, Sacramento county, State of California, have invented an Improvement in Straw-Dump Attachments for Combined Harvesters; and I hereby declare the following to be a full, clear, and exact description of the same.

My invention relates to the class of devices adapted to be attached to the tail end of machines known as "combined harvesters," the object of said devices being to catch the straw delivered from the straw-carrier of the thrashing portion of the combined machine.

My invention consists in the novel wheeled frame and its attached parts, the particular construction and arrangement of which will be hereinafter fully set forth, and the novel features specifically pointed out in the claims.

The object of my invention is to provide a simple and effective device for combined harvesters adapted to be readily connected with the rear end of the machine and to receive the straw therefrom, the attachment of said device being made in the best manner, so as not to rack or strain the end of the machine or to interfere with the free flow of the air.

Figure 1:
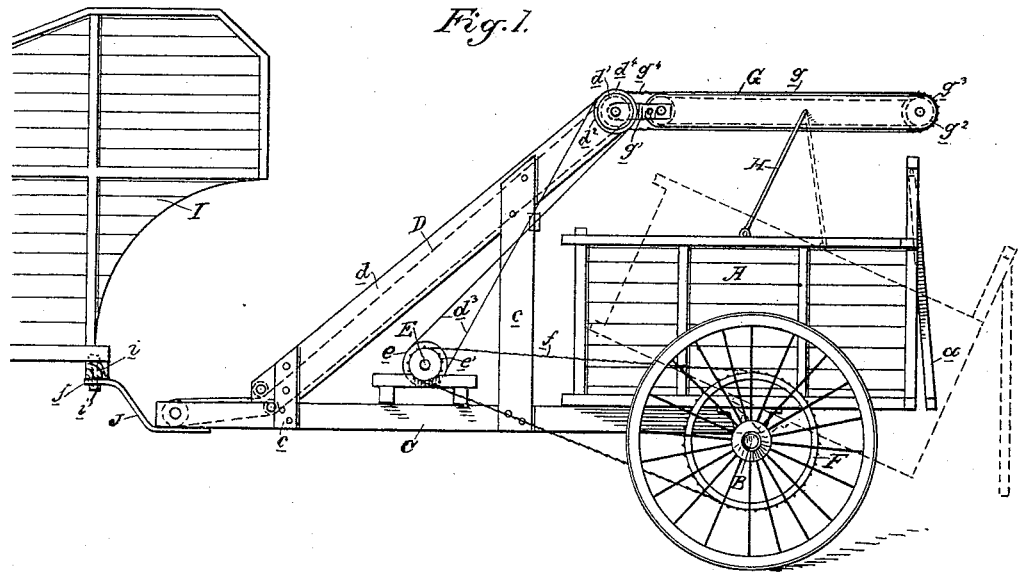
Figure 2:
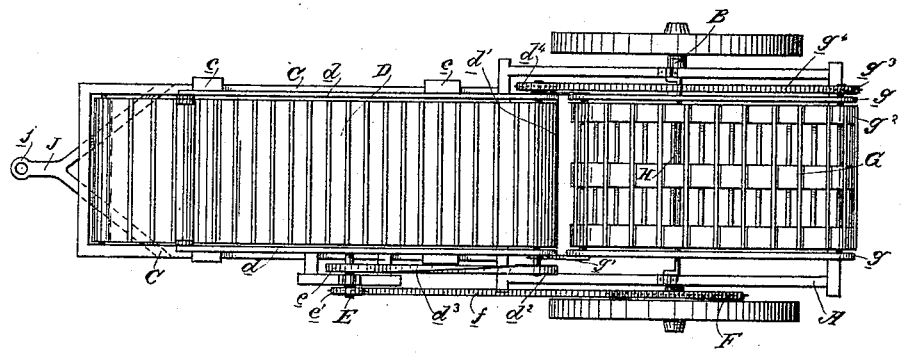

Referring to the accompanying drawings for a more complete explanation of my invention, Figure 1 a side elevation of my attachment. Fig. 2 is a plan of same.

A is a cart-body mounted upon a wheeled axle B in such a manner that it may turn about said axle, so as to dump its contents from its rear end, which said end is protected by a suitable swinging gate $a$.

C is a frame-work, the rear end of which is attached to the axle B, so as to be carried thereby. This frame serves as a support for the forward end of the cart-body, though the body is independent of it, in order to accomplish its dumping operation.

The frame C is provided with suitable uprights or standards $c$, which carry the inclined side pieces $d$ for the traveling draper D. This draper passes at its lower end over a suitable drum at the forward end of the frame C and at its rear or upper end over a drum $d'$ in the top of the side pieces $d$, and motion or travel is imparted to the draper by means of a pulley $d^2$ on the end of the driving-drum $d'$, from which a belt $d^3$ extends to a pulley $e$ on a counter-shaft E, the outer end of which carries a chain or sprocket pulley $e'$, from which a chain-belt $f$ extends to a sprocket wheel or pulley F on the axle B on its wheel.

The upper end of the draper D is in position to discharge its load directly into the cart-body; but in case it be desired to separate the shorter from the longer straw I have the endless traveling open-work carrier or screen G. This is mounted in a suitable frame-work $g$, which is supported above the cart-body by means of a bail H, pivoted at its lower end to each side of the cart-body and to the frame $g$ at its upper end, and extending across said frame, as shown, so that said bail is a swinging one, and while serving as a support for the traveling screen-carrier permits the proper dump of the cart-body A. The frame $g$ of the screen-carrier is connected by hinged links, as shown at $g'$, with the upper end of the draper-frame $d$.

The endless screen-carrier consists of two or more belts provided with cross-slats, as shown, so that the device is of an open-work character, which will allow the shorter straw to drop through it into the cart-body, while the longer straw is carried off the end and dropped onto the ground. The belts of the screen-carrier are mounted upon suitable end drums or pulleys, the one at the rear end being designated by $g^2$, and imparts a travel to the carrier by means of a sprocket or chain pulley $g^3$ on its end from which an endless chain $g^4$ extends to a sprocket pulley or wheel $d^4$ on the end of the driving-drum $d'$ of the draper D. This whole device is intended to to be attached to the rear end of a combined harvester. In order to show this attachment and its use in connection with the harvester, I have herein shown the tail end of the thrasher portion of the harvester and designated it by I.

The forward end of the frame C is provided with a goose-neck coupling J, the end of which has an eye $j$, which, lying under a beam $i$ of the frame of the main machine, receives a bolt $i'$, whereby the whole device may be readily attached to and disconnected from the main machine. This attachment, it will be seen, is low down, and the device is therefore carried by the stronger portion of the harvester instead of being attached to the upper portion or tail end, as devices of this general class are usually attached, and therefore there is less tendency to rack and strain the machine; and, again, it will be noticed that by arranging it in this low position a large space is left between the forward end of the draper D and the discharge of the tail end of the machine, so that a sufficiently free air-space is provided to avoid any tendency to choke in the dump of the machine and force the wind back into the thrasher. The horizontal position or arrangement of the lower end of draper D provides for this large space. It will be seen that the draper does not begin to rise until clear of the tail end of the main machine.

The operation of the device is as follows: When required, it is readily attached by the goose-neck J to the combined harvester. As the latter travels, the device is carried along with it and its parts receive their motion from the traction-wheels or wheel of the cart through the connections described. The straw from the tail end I of the harvester falls down freely upon the forward end of the draper D and is by it elevated, and, if desired, dumped directly into the cart-body A. If it be desired to separate the shorter from the longer straw, the traveling screen-carrier G is used, so that the shorter straw drops through into the cart-body while the longer is carried off over the rear end. When the cart-body has received its full load, it may be dumped at any desired point by turning it about its axle, this movement not being interfered with by any of the other parts, as the bail H is a swinging one.

Having thus described my invention, what I claim as new, and desire to secure by Letters Patent, is—

1. A straw-dump attachment for combined harvesters, consisting of a wheeled body, a forwardly-extending frame to be attached at its forward end to the rear end of the combined harvester, a draper carried by said frame with its forward end under the straw-discharge of the combined harvester and its rear end arranged to discharge the straw into the wheeled body, and power-transmitting connections comprising a counter-shaft, the pulleys and belt between said shaft and draper, and a driving-chain connection between the traction-wheel of the wheeled body and the counter-shaft, whereby the latter is driven, substantially as herein described.

2. A straw-dump attachment for combined harvesters, consisting of the cart-body A, having a wheeled axle, the forwardly-extending frame C, adapted to be connected with the rear end of the combined harvester, the inclined side pieces d, the endless draper D, mounted in the frame C and side pieces d, with its forward end under the straw-discharge of the combined harvester and its rear end above the cart-body, and the means for driving the draper, consisting of the counter-shaft E, the pulleys and belt between said shaft and the driving-drum of the draper, and the chain-pulleys and chain between the wheeled axle and the counter-shaft, substantially as herein described.

3. A straw-dump attachment for combined harvesters, consisting of the wheeled body A, the forwardly-projecting frame C, adapted to be connected with the rear end of the combined harvester, the traveling draper having its forward end under the straw-discharge of said harvester and its rear end above the wheeled body, and the traveling open-work screen-carrier G above the wheeled body and adapted to receive the straw from the traveling draper and separate the shorter from the longer straw, substantially as herein described.

4. A straw-dump attachment for combined harvesters, consisting of the tilting body A, having a wheeled axle, the fixed forwardly-projecting frame C, adapted to be attached at its forward end to the combined harvester, the traveling draper D, having its forward end under the straw-discharge of the harvester and its rear end above the tilting body, the traveling open-work screen-carrier G, adapted to receive the straw from the draper, and the swinging bail H, whereby the screen-carrier G is carried by and above the tilting body, substantially as herein described.

5. A straw-dump attachment for combined harvesters, consisting of the tilting body A, having a wheeled axle, the fixed forwardly-projecting frame C, the traveling draper D, the pulleys and belts and shaft by which the power of the wheeled axle is transmitted to the driving-drum of the draper, the open-work screen-carrier G in communication with the upper end of the draper, the swinging bail H, by which the screen-carrier is supported by and above the tilting body, and the chain and chain-pulleys, whereby said screen-carrier is driven from the driving-drum of the draper, substantially as herein described.

In witness whereof I have hereunto set my hand.

ALEXANDER McDONALD.

Witnesses:
ALBERT M. JOHNSON,
PHILIP S. DRIVER.